Patented Jan. 15, 1952

UNITED STATES PATENT OFFICE 2,582,292

PREPARATION OF BENZAL-IMINO COMPOUNDS

Clarence W. Sondern, Mendham, and Philip J. Breivogel, Glen Ridge, N. J., assignors to White Laboratories, Incorporated, Newark, N. J., a corporation of New Jersey No Drawing. Application February 3, 1949,
Serial No. 74,468

9 Claims. (Cl. 260—457)

1

The present invention relates to novel compounds useful in the production of pharmaceuticals and is more specifically concerned with a novel procedure whereby the said compounds may be produced.

Various diamines have recently attained prominence as antihistaminics, antimalarials, and sympathomimetic amines. The novel process of the present invention with its favorable economical and technical aspects has an important application in the commercial production of intermediates useful in the preparation of these new drugs.

Compounds having the general formula

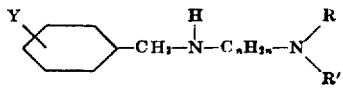

wherein R and R' are alkyl radicals, which may be the same, different, or which together form the remainder of an N-heterocyclic radical, wherein Y is selected from the group consisting of hydrogen, halogen and lower alkoxy radicals, and wherein $n$ is an integer from 1 to 4, inclusive, have been prepared in many varied manners. All of the methods employed for the preparation of these diamines have had disadvantages due to the expensive cost of the starting materials, the tediousness of the procedure or the poor yields obtained. It would be highly advantageous to have available a method of preparing such alkylene diamines which would employ inexpensive starting materials and which would give relatively high yields.

It is, therefore, an object of the present invention to provide a novel process for the production of certain alkylene diamines. A further object is the provision of a method for producing alkylene diamines using a simple and economical process. Another object is the provision of novel compounds. Other objects will become apparent hereinafter.

The foregoing and additional objects have been accomplished by reacting a benzaldehyde, having the formula:

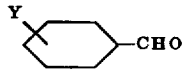

wherein Y is selected from the group consisting of hydrogen, halogen and lower alkoxy radicals, with a compound having the general formula: $H_2N$—$C_nH_{2n}$—Z, wherein Z is halogen or a bisulfate radical, i. e.,

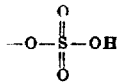

2 and wherein $n$ is an integer from 1 to 4, inclusive. The resulting aralkylidene compound may be reacted with a secondary amine to form a tertiary amine. Upon subsequent hydrogenation, the desired diamine is obtained.

It should be obvious from the foregoing that, by our process, an economical and simple method of producing alkylene diamines is provided. Our method employs relatively inexpensive starting materials as well as being simply and easily carried out with a minimum of equipment and expense.

Step I

The first step of our novel process consists of reacting benzaldehyde, halogen nuclearly-substituted or alkoxy nuclearly-substituted derivatives of benzaldehyde wherein the alkoxy group may contain from 1 to 6 carbon atoms, inclusive; for example, p-methoxybenzaldehyde, 3,4-dimethoxy-benzaldehyde, p-pentoxybenzaldehyde, p-chlorobenzaldehyde, o-iodobenzaldehyde, m-hexoxybenzaldehyde, p-fluorobenzaldehyde, m-chlorobenzaldehyde, o-ethoxybenzaldehyde, et cetera; with an alkylene amine of the formula $H_2N$—$C_nH_{2n}$—Z, wherein $n$ is an integer from 1 to 4, inclusive, and wherein Z is chlorine, bromine, iodine, or a bisulfate radical

for example, 2-aminoethylsulfuric acid, 2-bromoethylamine, 3-chloropropylamine, 3-aminopropylsulfuric acid, 3- or 4-aminobutysulfuric acid, et cetera. The reaction may be conducted in any convenient manner, such as by adding the aldehyde to the aminoalkysulfuric acid or aminoalkyl halide although the reverse procedure is entirely satisfactory. A salt of a weak acid and a strong base is ordinarily employed to ensure a desirable shift in the equilibrium, as well as reduce the reaction time. Representative salts of a weak acid and a strong base which may be employed are, for example, sodium carbonate, potassium carbonate, sodium acetate, et cetera. A solvent which is inert to the reactants and the reaction products, such as water, is ordinarily employed. Any suitable reaction temperature may be employed, such as, from 0 to 100 degrees centigrade; however, the preferred ranges are about room temperature or slightly below room temperature. Agitation is preferably employed to ensure efficient contact of the reactants. The reaction time is variable and depends upon a number of factors, for example, quantity of reactants, temperature, method of agitation, et cetera. The product of this step, which may be separated and purified in any convenient manner, is a substituted azomethine, or substituted-imino compound having the formula:

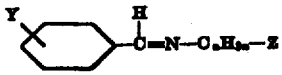

wherein Y, n and Z have the hereinbefore assigned values.

Step II

This step of our novel process consists of reacting the product of the first step, either before or after hydrogeneration of the imino linkage

with a secondary amine, for example, a dialkyl amine, such as dimethylamine, diethylamine, dipropylamine, methylbutylamine, ethyloctylamine, methyldecylamine, et cetera, or cyclic secondary amines such as piperidine, pyrrolidine, morpholine, thiomorpholine, or the like. A solvent is usually employed to simplify the reaction; however, this is not always necessary. Representative solvents which may be used, if desired, are ethanol, methanol, water, et cetera. The temperatures employed for the reaction is usually between 0 and 100 degrees centigrade, with the range between 20 and 80 degrees centigrade being preferred. An alkaline agent is usually employed to maintain a basic medium which will speed up the reaction time as well as neutralize the acid formed. Agitation is preferably employed to ensure efficient contact of the reactants. The time allowed for the reaction will vary and is dependent upon a number of factors, such as quantity of reactants, method of agitation, et cetera; however, a period of less than about six hours is ordinarily sufficient. The product of the reaction of this step is a tertiary amine wherein the hydrogen of the secondary amine joins with the group designated Z to replace the said Z group with the substituted amine.

Step III

The third step consists of hydrogenating, in the presence of a hydrogenation catalyst, the imino linkage, i. e.,

to a

linkage. Representative hydrogenation catalysts which may be employed are, for example, palladium (5 percent) supported on carbon, Adams platinum oxide, Raney nickel, et cetera. The temperature employed for this step is usually between about 20 and about 150 degrees centigrade; however, temperatures between about 35 and 65 degrees centigrade are preferred. The reduction may be performed in any convenient manner which will be readily apparent to one skilled in the art.

It is to be understood that the order of Steps II and III is not critical. The product of the reaction of Step I may be hydrogenated and then reacted with a secondary amine, if this order of reaction is preferred. Furthermore, it is within the scope of the present invention to react the reaction product of Step I with hydrogen as the product is generated, in situ. However, a preferred embodiment of the present invention contemplates the employment of the reactions in the order indicated.

The following examples are given merely to illustrate the practice of the present invention and are not to be construed as limiting.

EXAMPLE 1

*Preparation of N'N-dimethyl-N'-(p-methoxybenzylidene)-ethylenediamine*

One hundred and thirty-six grams (1.0 mole) of p-methoxybenzaldehyde were added to a solution of 225 grams (1.1 moles) of 2-bromoethylamine hydrobromide in 225 milliliters of water. The mixture was stirred rapidly at a temperature of 10-15 degrees centigrade while 58 grams (0.55 mole) of anhydrous sodium carbonate were added over a period of forty-five minutes. When all the sodium carbonate was added, stirring was continued at 25 degrees centigrade for one hour more to complete the formation of the Schiff base. The reaction mixture was then added to 410 milliliters (3.37 moles) of 37 percent aqueous dimethylamine solution over a period of one-half hour at a temperature of 23-27 degrees centigrade. When all of the solution was added, stirring at 30 degrees centigrade was continued for one-half hour longer, and 60 grams (0.56 mole) of anhydrous sodium carbonate were added. The reaction mixture was stirred for another one-half hour, then heated to 60 degrees centigrade under vacuum to remove most of the excess dimethylamine. After cooling to room temperature, the yellow, oily layer was drawn off and dried over potassium carbonate. The dried crude Schiff base weighed 168 grams. An additional 26.0 grams of crude Schiff base was recovered from the aqueous liquors and potassium carbonate residues by extraction with 150 milliliters of ether bringing the total yield of crude product up to 193 grams.

The crude product was purified by vacuum distillation. The fraction distilling at 108-110 degrees centigrade under 0.24 millimeter pressure (absolute) was collected separately. This weighed 161 grams and was found to be substantially pure N,N-dimethyl-N'-(p-methoxybenzylidene)-ethylenediamine having a specific gravity of 1.0102 at 25 degrees centigrade and a refractive index $n_D^{25}$ of 1.5470.

EXAMPLE 2

*Preparation of N,N-dimethyl-N'-(p-methoxybenzylidene)-ethylenediamine*

One hundred and fifty-seven grams (1.15 moles) of p-methoxybenzaldehyde were added to a solution of 282 grams of 2-aminoethylsulfuric acid in 310 milliliters of water at 85 degrees centigrade. The mixture was then stirred at 70-80 degrees centigrade while 106 grams (1 mole) of sodium carbonate were added with constant stirring over a period of about fifteen minutes. The p-methoxybenzaldehyde gradually dissolved to form the Schiff base and about five minutes after the last addition of sodium carbonate, a clear yellow solution resulted. A mixture of 720 milliliters (6 moles) of 37 percent aqueous dimethylamine solution and 360 milliliters of specially denatured 3A alcohol were added to the reaction mixture which was then refluxed for about eight hours. During the reflux period, the temperature of the reaction mixture gradually rose from 69 degrees to 79 degrees centigrade. The reaction was considered finished when two moles of sulfate were liberated from hundred five milliliters (1.7 mole) of 37 percent aqueous dimethylamine were added and the solution refluxed at 72-75 degrees centigrade for ten hours. During the reflux period the reaction mixture gradually separated into two layers. It was cooled to 50 degrees centigrade, 21.6 grams (0.5 mole) of 96 percent sodium hydroxide added in small portions with rapid stirring, and the mixture distilled under about 50 millimeters pressure to remove the alcohol and excess dimethylamine. The residue in the distilling flask was cooled to 45 degrees centigrade and the oily layer separated. The aqueous layer was cooled to 25 degrees centigrade, extracted with 50 milliliters of ether and the ether extract combined with the oily portion which was then thoroughly dried over anhydrous potassium carbonate. All the solvent was removed by distillation and the residue purified by distillation under vacuum. The fraction distilling at 92-94 degrees centigrade under 0.27 millimeter pressure was collected separately. This fraction weighed 89 grams and was found to be practically pure N,N-dimethyl-N'-(p-chlorobenzylidene)-ethylenediamine, a colorless liquid having a specific gravity of 1.0615 at 25 degrees centigrade and an index of refraction ($n_D^{25}$) of 1.5480. By analysis it was found to contain 16.70 percent chlorine (theoretical 16.83 percent chlorine).

EXAMPLE 6

*Preparation of N,N-dimethyl-N'-(p-chlorobenzyl)-ethylenediamine by catalytic hydrogenation of N,N-dimethyl-N'-(p-chlorobenzylidene)-ethylenediamine*

Two hundred and eleven grams (1.0 mole) of N,N-dimethyl-N'-(p-chlorobenylidene)-ethylenediamine dissolved in 1500 milliliters of methanol were hydrogenated at 20-27 degrees centigrade and approximately atmospheric pressure, in the presence of 3.0 grams of a palladium supported on carbon catalyst containing 5 percent palladium. After two hours, when 120 percent of the theoretical amount of hydrogen required for the saturation of the

linkage was absorbed, the catalyst was filtered off and most of the solvent removed by distillation. The residue which weighed 275 grams was mixed with a solution of 145 grams of concentrated hydrochloric acid in 800 milliliters of water and cooled to 20 degrees centigrade. The crystalline precipitate of p-chlorobenzaldehyde which resulted from the hydrolysis of a small amount of unchanged Schiff base, was removed by filtration. The base was liberated by the addition of 90 grams of sodium hydroxide to the clear filtrate. The oily layer was separated, dried over anhydrous potassium carbonate and purified by fractional distillation under vacuum. Two main fractions and one intermediate fraction were obtained. The first fraction weighed 43 grams. It distilled at 70-73 degrees centigrade at a pressure of 0.3 millimeter mercury, and consisted of practically pure N,N-dimethyl-N'-benzylethylenediamine having a specific gravity of 0.9343 at 25 degrees centigrade and an index of refraction ($n_D^{25}$) of 1.5075. The intermediate fraction weighed 4 grams and consisted of a partly dechlorinated product. The last fraction weighed 94 grams and distilled at 95-97 degrees centigrade at a pressure of 0.47 millimeter of mercury. This fraction consisted of practically pure N,N-dimethyl-N'-(p-chlorobenzyl)-ethylenediamine having a specific gravity of 1.0515 at 25 degrees centigrade and an index of refraction ($n_D^{25}$) of 1.5198. On analysis this was found to contain 16.35 percent of chlorine (theoretical 16.67 percent chlorine).

Various modifications may be made in the method of the present invention without departing from the spirit or scope thereof, and, it is to be understood as limited only by the appended claims.

We claim:

1. In a process for the preparation of substituted azomethine compounds, the step which includes: contacting, at a temperature between about zero and about 100 degrees centigrade, a compound having the formula:

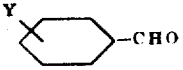

wherein Y is a radical selected from the group consisting of hydrogen, halogen and alkoxy radicals containing from 1 to 6 carbon atoms, inclusive, with a compound of the formula $$H_2N\text{---}C_nH_{2n}\text{---}Z$$

wherein $n$ is an integer from 2 to 4, inclusive, and wherein Z is a radical selected from the group consisting of halogen and bisulfate.

2. The process of claim 1, wherein the temperature employed is about room temperature, and wherein an inert solvent and a salt of a weak acid and a strong base is employed.

3. In a process for the preparation of azomethine-amino compounds, the steps of which include: (1) contacting, at a tempertaure between about zero and about 100 degrees centigrade, a compound having the formula:

wherein Y is a radical selected from the group consisting of hydrogen, halogen and alkoxy radicals containing from 1 to 6 carbon atoms, inclusive, with a compound of the formula $$H_2N\text{---}C_nH_{2n}\text{---}Z$$

wherein $n$ is an integer from 2 to 4, inclusive, and wherein Z is a radical selected from the group consisting of halogen and bisulfate; and (2) reacting the substituted-azomethine compound thus produced with a dialkyl secondary amine.

4. The process of claim 3, step (2), wherein the temperature employed is between 20 and 80 degrees centigrade and wherein an alkaline agent is employed.

5. In a process for the preparation of azomethine-amino compounds, the steps which include: (1) contacting, at a temperature slightly below room temperature, a compound having the formula:

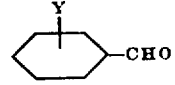

wherein Y is a radical selected from the group consisting of hydrogen, halogen, and alkoxy radicals containing from one to six carbon atoms, inclusive, with a compound having the formula $H_2N\text{---}C_nH_{2n}\text{---}Z$, wherein $n$ is an integer from two to four, inclusive, and wherein Z is a radical selected from the group consisting of halogen and bisulfate, in an inert solvent and in the presence of a salt of a weak acid and a strong base; and, the 2-aminoethylsulfuric acid. Another 106 grams (1 mole) portion of sodium carbonate were added to the reaction mixture and refluxing continued for one-half hour more. The reaction mixture was then concentrated to 1000 milliliters to remove the excess dimethylamine and most of the alcohol. The concentrated reaction mixture was cooled to 35 degrees centigrade, filtered to remove the sodium sulfate and the filter cake washed with 100 milliliters of methanol. The filtrate formed two layers which were separated. The aqueous layer was extracted with 200 milliliters of ether, the ether extract added to the oily layer and the mixture carefully dried over potassium carbonate. After removal of the ether and alcohol by distillation, there remained 221 grams of a deep orange colored liquid. This was purified by distillation under vacuum. The first fraction distilled at 80–100 degrees centigrade under a pressure of 0.26 millimeter of mercury. It was obtained as a colorless liquid weighing 21.8 grams, having a refractive index ($n_D^{25}$) of 1.5575 and by analysis was found to be a mixture of about 40 percent p-methoxybenzaldehyde and 60 percent of the desired Schiff base. The second fraction distilled at 103–108 degrees centigrade at a pressure of 0.35 millimeter of mercury. It was obtained as a colorless liquid weighing 16.2 grams, having a refractive index ($n_D^{25}$) of 1.5502 and by analysis was found to be a mixture of about 10 percent p-methoxybenzaldehyde and 90 percent of the desired Schiff base. The third and last fraction distilled from 114–115 degrees centigrade at a pressure of 0.50 millimeter of mercury and weighed 167 grams. It was obtained as a colorless liquid having a refractive index ($n_D^{25}$) of 1.5468, a specific gravity of 1.0063 at 25 degrees centigrade and was found to be the practicallly pure Schiff base, N,N-dimethyl-N'-(p-methoxybenzylidine)-ethylenediamine.

EXAMPLE 3

Preparation of N,N-dimethyl-N'-(benzylidine)-ethylenediamine

A solution of 42.6 grams (1.0 mole) of 96 percent sodium hydroxide in 80 milliliters of water was added with rapid stirring to a suspension of 141 grams (1.0 mole) of 2-aminoethylsulfuric acid in 140 milliliters of water over a period of fifteen minutes at 15–20 degrees centigrade. Stirring was continued and, when solution was complete, 106 grams (1.0 mole) of benzaldehyde and 30 milliliters of specially denatured 3A alcohol were added. The resulting mixture was stirred at 40–45 degrees centigrade for twenty-five minutes when solution was complete. Four hundred ten milliliters (3.4 moles) of 37 percent aqueous dimethylamine were added and the solution refluxed at 72–75 degree centigrade for two hours. During the reflux period the reaction mixture gradually separated into two layers. A solution of 42.6 grams (1.0 mole) of 96 percent sodium hydroxide in 60 milliliters of water was then added during fifteen minutes and stirring at reflux temperature continued for one hour longer. The mixture was then distilled under about 50 millimeters pressure to remove the alcohol and excess dimethylamine. The residue in the distilling flask was cooled to about 45 degrees centigrade and the oily layer separated. The aqueous layer was cooled to 25 degrees centigrade, extracted with 50 milliliters of ether, the ether extract combined with the oily portion and then thoroughly dried over anhydrous potassium carbonate. All the solvent was removed by distillation and the residue purified by distillation under vacuum. The fraction distilling at 76 degrees centigrade at a pressure of 0.2 millimeter of mercury was collected separately. This fraction weighed 137 grams and was found to be practically pure N,N-dimethyl-N'-(benzylidene)-ethylenediamine, a colorless liquid having a specific gravity of 0.9461 at 25 degrees centigrade and an index of refraction ($n_D^{25}$) of 1.5380. By titration with standard hydrochloric acid using methyl orange as the indicator a 1.5 gram sample consumed 33.6 milliliters of 0.5 normal hydrochloric acid which is equivalent to a purity of 98.6 percent.

EXAMPLE 4

Preparation of N,N-dimethyl-N'-(p-methoxybenzyl)-ethylenediamine by the catalytic hydrogenation of N,N-dimethyl-N'-(p-methoxybenzylidene)-ethylenediamine Two hundred and forty-three grams (1.173 moles) of N,N-dimethyl-N'-(p-methoxybenzylidene)-ethylenediamine dissolved in 1500 milliliters of specially denatured 3A alcohol, were hydrogenated at 50 degrees centigrade and approximately atmospheric pressure, in the presence of 3.0 grams of a palladium supported on carbon catalyst containing 5 percent of palladium. After three hours, when the theoretical amount of hydrogen was absorbed, the catalyst was removed by filtration and all the solvent removed from the filtrate by distillation, first at atmospheric pressure and then under vacuum. The light-amber colored, oily residue which weighed 244 grams was then distilled under vacuum. The fraction distilling at 106–107 degrees centigrade at a pressure of 0.52 millimeter of mercury weighed 214 grams and was found to be practically pure N,N-dimethyl-N'-(p-methoxybenzyl)-ethylenediamine. It was obtained as a colorless liquid having a refractive index ($n_D^{25}$) of 1.5148 and a specific gravity of 0.9860 at 25 degrees centigrade.

The dihydrochloride was prepared by adding the theoretical amount of alcoholic hydrogen chloride to a concentrated solution of the base in anhydrous alcohol, heating the mixture to dissolve the precipitated salt and allowing it to crystallize. After recrystallization from a mixture of methanol and ethyl acetate, the dihydrochloride of N,N-dimethyl-N'-(p-methoxybenzyl)-ethylenediamine was obtained in the form of small white plates melting at 201 to 202 degrees centigrade, corrected.

EXAMPLE 5

Preparation of N,N-dimethyl-N'-(p-chlorobenzylidene)-ethylenediamine

A solution of 21.3 grams (0.5 mole) of 96 percent sodium hydroxide in 30 milliliters of water was added over a period of fifteen minutes with rapid stirring to a suspension of 71 grams (0.5 mole) of 2-aminoethylsulfuric acid in 70 milliliters of water maintained at 15–20 degrees centigrade. Stirring was continued and after ten minutes more, when solution was complete, 70 grams (0.5 mole) of p-chlorobenzaldehyde and 75 milliliters of specially denatured 3A alcohol were added. The resulting mixture was stirred at 40 degrees centigrade for about 20 minutes until solution was complete and then for another one-half hour at 30–35 degrees centigrade. Two (2) reacting the substituted-azomethine compound thus produced with a dialkyl secondary amine in a solvent at a temperature between 20 and 80 degrees centigrade and in the presence of an alkaline agent.

6. In a process for the production of substituted-azomethine compounds, the step which includes: contacting, at a temperature between about zero and 100 degrees centigrade, para-methoxybenzaldehyde with a compound having the formula $H_2N-C_nH_{2n}-Z$, wherein $n$ is an integer from two to four, inclusive, and wherein Z is a radical selected from the group consisting of halogen and bisulfate.

7. In a process for the production of azomethine-amino compounds, the step which includes: contacting, at a temperature between about zero and 100 degrees centigrate, para-methoxybenzaldehyde with a compound having the formula $H_2N-C_nH_{2n}-Z$, wherein $n$ is an integer from two to four, inclusive, and wherein Z is a radical selected from the group consisting of halogen and bisulfate; and, thereafter reacting the substituted-azomethine thus produced with a dialkyl secondary amine to prepare an azomethine-amino compound.

8. In a process for the production of N-(para-methoxybenzylidene)-2-aminoethylsulfuric acid, the step which includes: contacting, at a temperature between about zero and 100 degrees centigrade, para-methoxybenzaldehyde with 2-aminoethylsulfuric acid.

9. In a process for the production of N,N-dimethyl - N' - (para - methoxybenzylidene)-ethylenediamine, the steps which include: contacting, at a temperature between about zero and 100 degrees centigrade, para-methoxybenzaldehyde with 2-aminoethylsulfuric acid; reacting the N-(para-methoxybenzylidene) - 2 - aminoethylsulfuric acid thus produced with dimethylamine; and, separating N,N - dimethyl - N' - (para-methoxybenzylidene)-ethylenediamine from the reaction mixture.

CLARENCE W. SONDERN.
PHILIP J. BREIVOGEL.

REFERENCES CITED

The following references are of record in the file of this patent:

UNITED STATES PATENTS

| Number | Name | Date |
|---|---|---|
| 2,433,979 | Billman | Jan. 6, 1948 |

FOREIGN PATENTS

| Number | Country | Date |
|---|---|---|
| 559,500 | Germany | Sept. 20, 1932 |
| 598,312 | Great Britain | Feb. 16, 1948 |

OTHER REFERENCES

Chemical Abstracts, vol. 37 (1943), pp. 1996–1997 (Abstract of Wojahn et al., "Arch. Pharm.," vol. 280 (1942), pp. 215–226).

Certificate of Correction

Patent No. 2,582,292

January 15, 1952

CLARENCE W. SONDERN ET AL.

It is hereby certified that error appears in the printed specification of the above numbered patent requiring correction as follows:

Column 1, line 53, for "Z is halogen" read *Z is a halogen*; column 2, line 36, for "4-aminobutysulfuric" read *4-aminobutylsulfuric*; line 39, for "aminoalkysulfuric" read *aminoalkylsulfuric*; column 4, line 8, Example 1, in the heading thereto, for "N'N-dimethyl-N'-" read *N,N-dimethyl-N'-*; column 7, line 37, for "(p-chlorobenbylidene)-" read *(p-chlorobenzylidene)-*; column 8, line 36, before "which" strike out "of";

and that the said Letters Patent should be read as corrected above, so that the same may conform to the record of the case in the Patent Office.

Signed and sealed this 6th day of May, A. D. 1952.

[SEAL]

THOMAS F. MURPHY,
*Assistant Commissioner of Patents.*